INVENTOR.
RUSSELL W. TACCONE

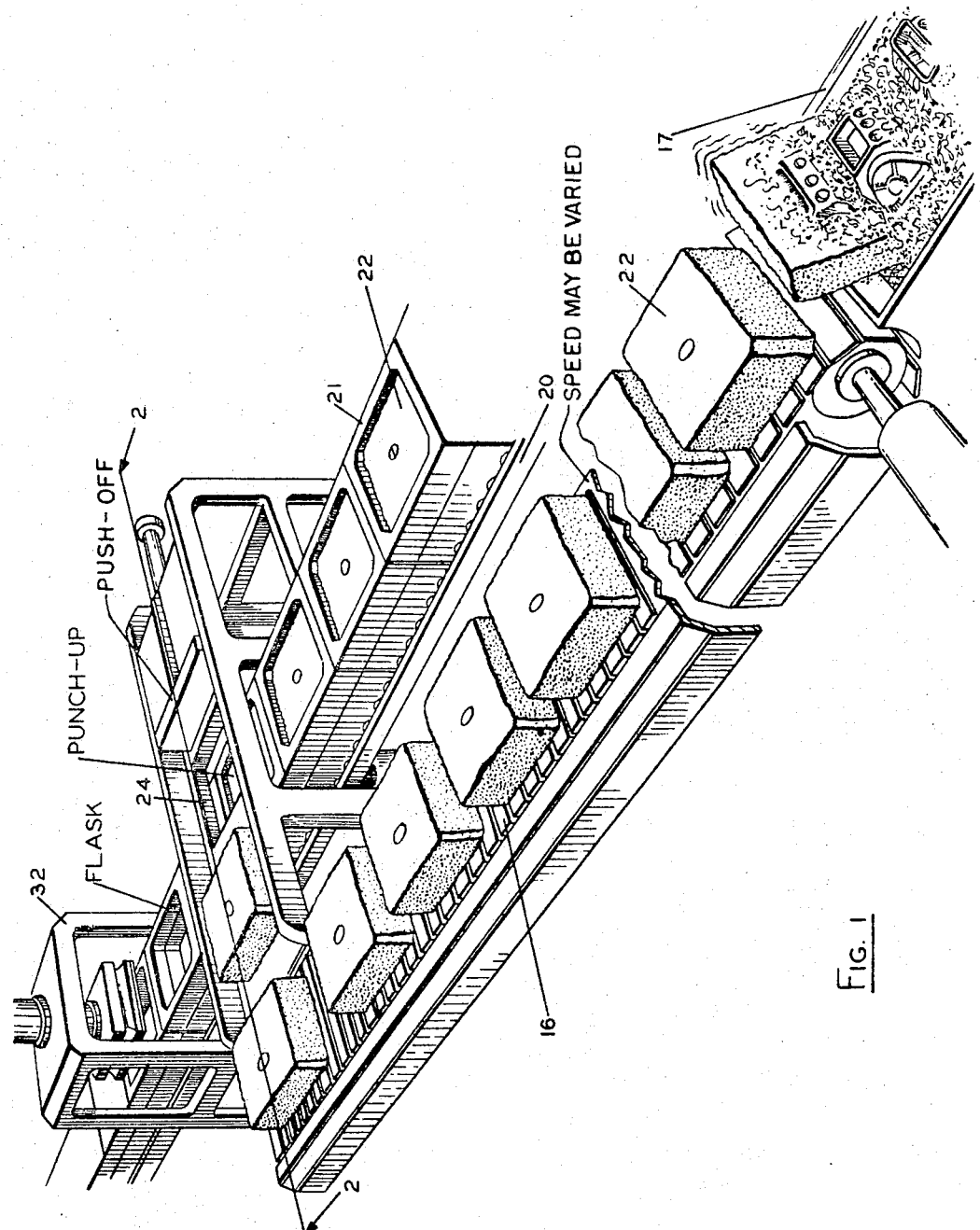

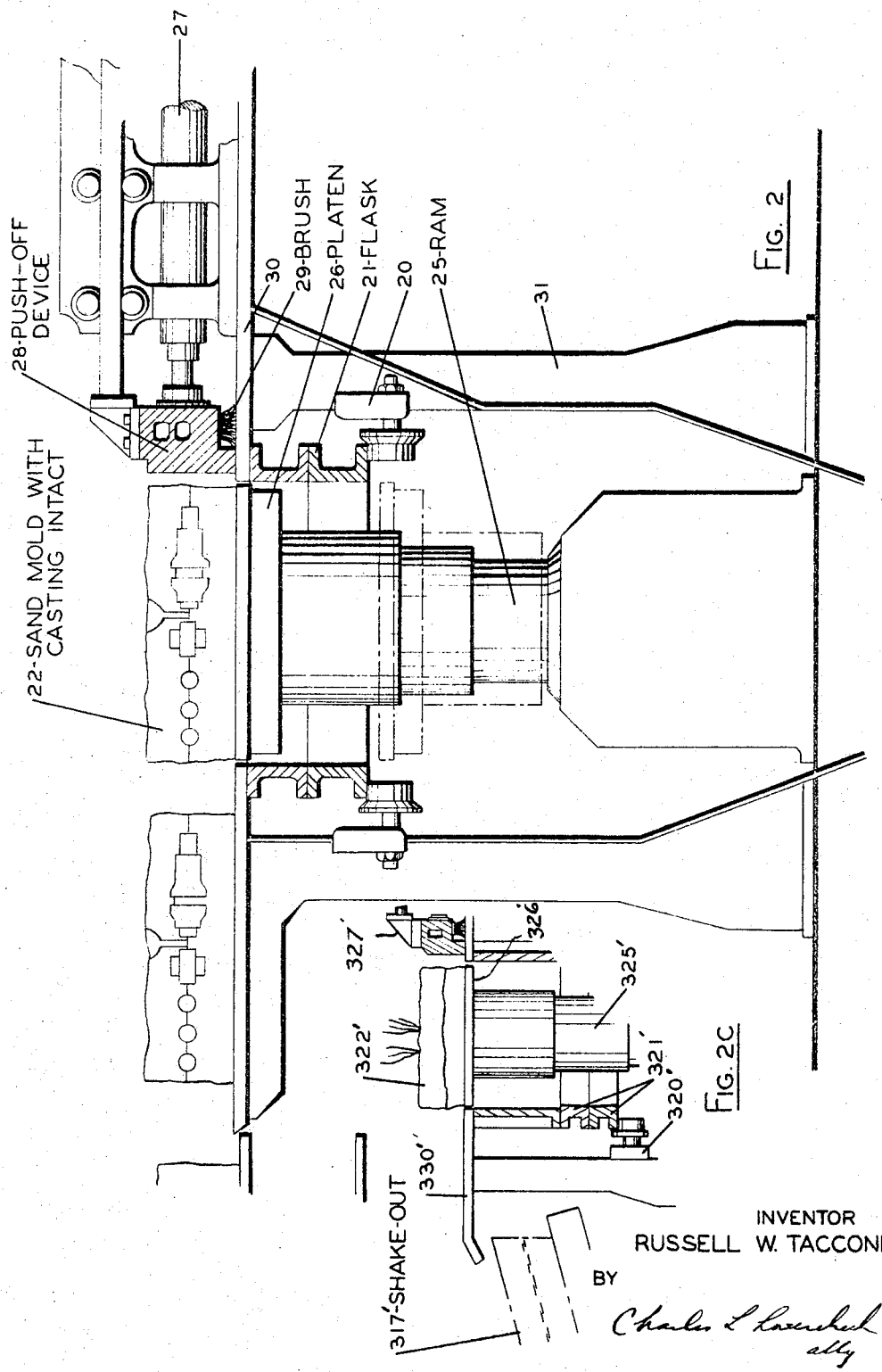

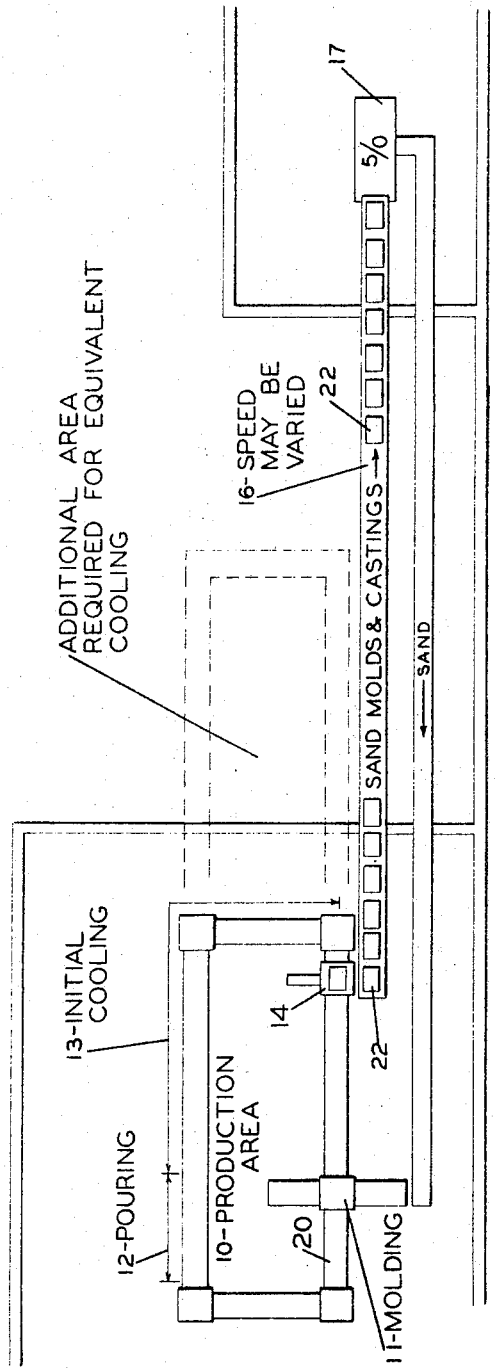

Sept. 20, 1966   R. W. TACCONE   3,273,210
MACHINE FOR REMOVING MOLDS FROM FLASKS
Filed Nov. 7, 1963   7 Sheets-Sheet 6

INVENTOR.
RUSSELL W. TACCONE
BY
Charles L. Lovercheck
att

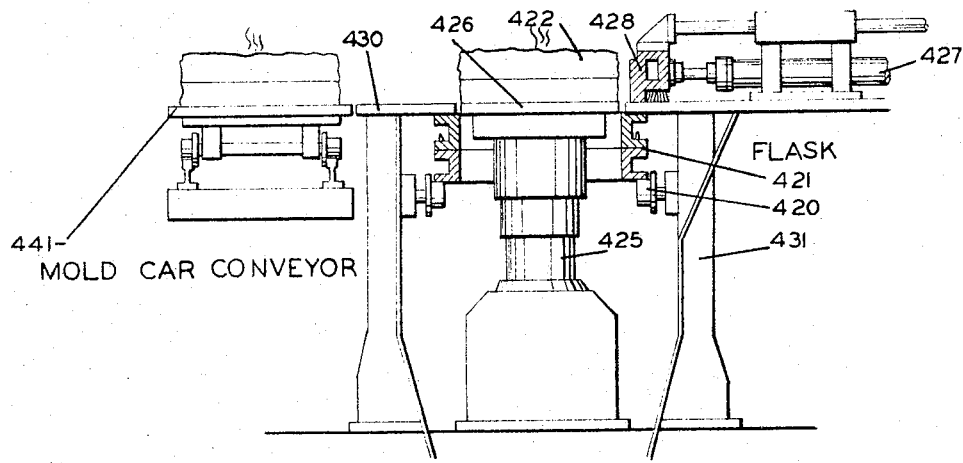
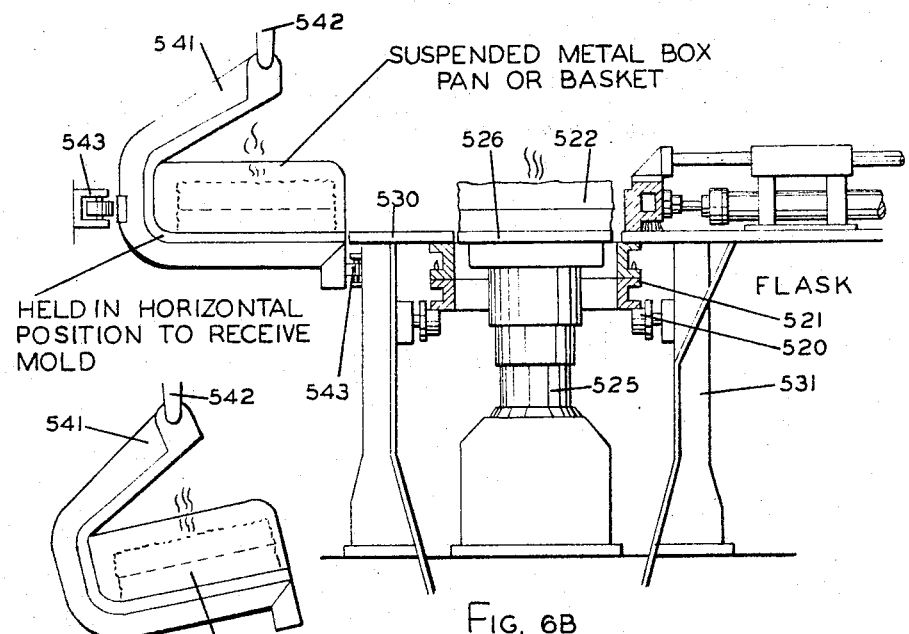

3,273,210
MACHINE FOR REMOVING MOLDS FROM FLASKS
Russell W. Taccone, Erie, Pa., assignor to Taccone Corporation, North East, Pa., a corporation of Pennsylvania
Filed Nov. 7, 1963, Ser. No. 322,104
10 Claims. (Cl. 22—95.5)

This invention relates to molding machines and, more particularly, to molding systems for removing castings from the sand in flasks.

The machine disclosed herein combines two operations which are involved in the design and operation of a foundry. These two factors are (1) mold shake-out and casting removal; and (2) casting cooling.

Depending upon the production characteristics of the particular foundry and the type of casting manufactured, the shake-out of molds, which is the removal of sand and castings from the molding flask, may involve the removal of the upper half of the mold or cope in order that the casting which is thus exposed can be manually or otherwise picked out from the sand in the drag or lower half of the mold. In some other applications, the entire mold, with the casting intact in the sand, is removed from the pouring and cooling line. The mold may or may not be inverted and then the sand and casting either pushed bodily, vibrated, jarred, or jolted from the flask. Either of these applications requires moving a part or a whole flask or mold from the normal flow of the production line in order to accomplish the shake-out or casting removal operation and then, of course, replace this flask or flask part back into the line so it may reassume the normal flow matters.

Both of the two above mentioned applications contaminate the ambient air with dust, steam, and gases. They also cause noise, confusion, and safety hazards in the areas in which the flask or flask part is removed from the line.

In another method of mold shake-out which is very commonly used, the entire mold is removed from the normal flow of the production line and the flask, sand, and casting are placed onto a vibrating, jarring, or jolting machine which then rattles the molding flasks sufficiently to break the sand and castings loose and lets them drop from the flask.

A casting, after pouring, is usually considered in two categories (a) initial cooling; and (b) final cooling. Initial cooling is referred to as the relatively short time after the molten metal has been poured into the mold cavity after the outer surface or the skin of the casting becomes solidified sufficiently to permit additional handling of the mold without any risk of damage to the physical shape or other characteristics of the casting itself. As long as the casting is in its semi-fluid state; that is, with the casting varying from a cooling skin on the outer surface of the casting to molten metal encased and intact at the center in the sand mold into which it relies for structural support and insulation, the casting will not change its physical, structural, nor metallurgical characteristics.

Final cooling is referred to as that additional period of cooling which permits the remainder of the casting to solidify and for the metal throughout the casting to pass through and drop below the critical temperature range, at which time metallurgical transitions take place and are controlled. The length of initial cooling time for the outer skin of a heavy section casting to be created may not require much more time than the outer skin of a small section casting whereas the final cooling time for a heavy section casting may require one hour's cooling as against a final cooling time of up to ten minutes for a light section casting.

The total cooling time which includes initial and final cooling time is required to achieve three purposes:

(1) The casting must be solidified so that it will not become misshapen when it is removed from the sand mold;

(2) The casting must be reduced to a temperature which is safe and reasonably comfortable for the workers throughout subsequent operations; and (3) The micro-structure of the metal poured into the mold cavity must be given time to assume and retain its correct formation in order to present the required metallurgical characteristics.

With the advance of metallurgical practices, it is now becoming important that the precise time of cooling, as well as the rate of cooling, be controlled and often be varied in order that the standard metals as well as the new alloyed metals achieve and retain their "as cast" characteristics. As an example of this, extensive tests which foundrymen have run on the new nodular type irons have proved that it is possible, by controlling the rate and time of casting cooling, to achieve an "as cast" control over hardness and ductility of the iron, thus eliminating additional equipment and additional operations to impart this controlled hardness and ductility to the casting.

The factors of mold shake-out and casting removal and casting cooling present continued difficulties to the foundryman in the design, purchase, scheduling, and operation of his foundry equipment. It is standard practice with foundrymen to schedule their production rate and thus determine the cooling rate based upon the anticipated optimum cooling which will be required for the entire range of their operation. This practice frequently requires that the floor area committed to the production unit, as well as the equipment used in the production unit, be sufficient to meet the requirements of the heaviest and most difficult job and, therefore, far in excess of what is required or could be required to run their least difficult job. Because of the restriction which is placed on the foundryman by applying equipment in this manner, it is quite often the foundryman's practice to limit the production capability of the molding equipment in his foundry to suit the needs of his most difficult casting, thus sacrificing a great deal of flexibility and much of his ability to remain competitive in the sale of the less difficult castings.

The machine disclosed herein eliminates or, at least, reduces the restrictions which are placed upon the foundryman by the two above described factors. The machine removes the casting and its sand mold intact from the molding flasks after the initial cooling stage has been passed. This frees the flask for subsequent molding operation at an earlier time in the production cycle and, also, permits controlled variation of the final cooling stage of the casting while the casting, in its sand mold, is being handled on auxiliary equipment.

The machine consists of two basic parts:

(1) *Punch up device.*—While the molding flasks, sand mold, and casting are stationary and are retained in position, a platen or series of platens, attached to one or more rams, push the sand mold with the casting intact from the molding flask to a position above the top surface of the molding flask.

The platen or series of platens are affixed to one or more hydraulic, pneumatic, air on oil mechanical, or other type of rams by means of which the pressure exerted, the rate of speed of the ram travel, and/or a variance in ram pressure combined with ram travel speed can be controlled. After the sand mold, with casting intact, has been pushed up through the flask and comes to rest at a position above the top of the flask, it is removed.

(2) *Push off device.*—A plow or pusher blade attached to one or more hydraulic, pneumatic, mechanical, or other type cylinders pushes the sand mold with castings intact from the platen and onto or into the auxiliary conveying equipment. This plow or pusher blade may have a brush attached thereto which will serve to brush loose sand from the platen or series of platens as well as from the transfer plate or chute.

The punch up and the push off devices may be contained in a common structural steel frame or may each be contained by their own individual structural frame. In some special applications, in order to achieve a higher production rate, it may be necessary to supplement the motion of the punch up device with controlled light impact vibration in order to assist the breaking or accelerate the rate of breaking of the bond between the molding sand and the inside surface of the molding flask.

This punch up machine may be used in connection with a vibrating shake-out for the separation of sand and castings immediately after being punched out or it may be used in conjunction with a wide variety of one or more types of auxiliary handling equipment such as woven metal belt conveyors, steel pane conveyors, or overhead conveyors from which metal boxes, pans, or baskets are suspended.

Some of the advantages of the machine disclosed herein are:

(1) It eliminates damage to flasks, flask pins, and flask bushings which is caused by vibrating, jarring, or jolting flasks to remove sand and castings.

(2) It simplifies molding flask cleaning and subsequent handling by removal, intact, of sand and castings.

(3) The removal of the sand and castings intact and the inherent improved flask cleaning simplify the separation of the upper from the lower flask for subsequent production.

(4) It reduces the retained temperature of the molding flasks and the detrimental effect of high flask temperature.

(5) It reduces the retained temperature of the molding sand by allowing more rapid heat dispersion. This simplifies rebonding of the sand for subsequent reuse.

(6) It reduces the amount of rebonding of the molding sand by reducing the amount of bond "burn-out" through more rapid heat dispersion.

(7) It permits additional cooling without additional flasks and flask handling facilities.

(8) It permits dust, gas, and steam collection during the final cooling cycle remote from the production area.

(9) It requires less floor area for the molding unit by eliminating excessive cooling facilities from the molding unit.

(10) When used with the immediate shake-out, it permits the transfer of the sand and casting onto a shake-out machine without undue elevation of the cooling conveyor.

(11) It permits removal of the sand and casting from the molding flask without separating the upper and lower flask parts when the lower part of the flask has boxes.

(12) It permits the removal of the sand and castings without bodily removing the flask and mold from the "In-Line" production line.

(13) It permits removal of the sand and castings from the molding flask, with the bars in the upper and lower flask parts, without separating the upper and lower flask parts if the castings will pass between the bars in the upper flask part.

(14) It permits this removal without bodily removing the flask and mold from the "In-Line" production line.

(15) It permits the use of simplified automatic or semi-automatic casting handling equipment to remove castings from the sand mold without the usual interference of the molding flask.

(16) It permits delivery of the sand and castings to the shake-out in remote areas without disrupting the flow of flasks of removing the flasks from the normal flow pattern.

(17) It permits selective varying cooling without varying production rate.

(18) It permits varied cooling cycles for alternate patterns at the same time a constant production rate is maintained.

(19) It permits operating the production unit at optimum speed rather than speed dictated by the cooling cycle.

(20) It permits reduction in cooling time for any given casting by removal of the molding flask, thus permitting more rapid heat dispersion.

(21) It permits acceleration of casting cooling without "air quench" by removal of some sand selectively to accelerate heat dispersion.

(22) With the use of mutliple auxiliary handling equipment coupled with variable speed on the handling equipment, a multiplicity of cooling times is available without involving an excess of flasks.

(23) When used in conjunction with multiple handling equipment in a molding line producing from alternate patterns, the castings can be pre-sorted into the cooling zone to simplify handling to and through the cleaning department.

(24) It permits optimum production rate and the cooling cycle required for each type of casting individually rather than cooling a normally short cooling cycle casting to the minimum cycle required for a long cooling cycle casting.

(25) It permits selective casting picking without the sand and casting being vibrated. Some may be picked and some run into a vibrating shake-out.

(26) It permits the selective "air-quenching" of some castings with the dirt, gas, and steam being contained in a remote area.

(27) It permits the casting of two or more different metals, with different cooling characteristics, on a common molding line.

(28) It permits the control of "as cast" characteristics for standard and alloy metals by controlled cooling time with the minimum of auxiliary equipment.

It is, accordingly, an object of the present invention to provide an improved foundry system.

Another object of the invention is to provide an improved machine for removing castings from flasks.

Still another object of the invention is to provide an improved punch up machine.

A further object of the invention is to provide a foundry machine which is simple in construction, economical to manufacture, efficient in operation, and which will provide efficient results in a foundry process.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 shows a machine for removing sand and castings from flasks according to the invention;

FIG. 2 is a cross sectional view taken on line 2—2 of FIG. 1;

FIG. 2C is a view of another embodiment of the invention;

FIG. 3 is a plan view of a production area incorporating the punch up machine shown in FIGS. 1 and 2 and the auxiliary conveyor for cooling sand in flasks;

FIGS. 6A, 6B, and 6C show other embodiments of the invention.

Figure 2A:
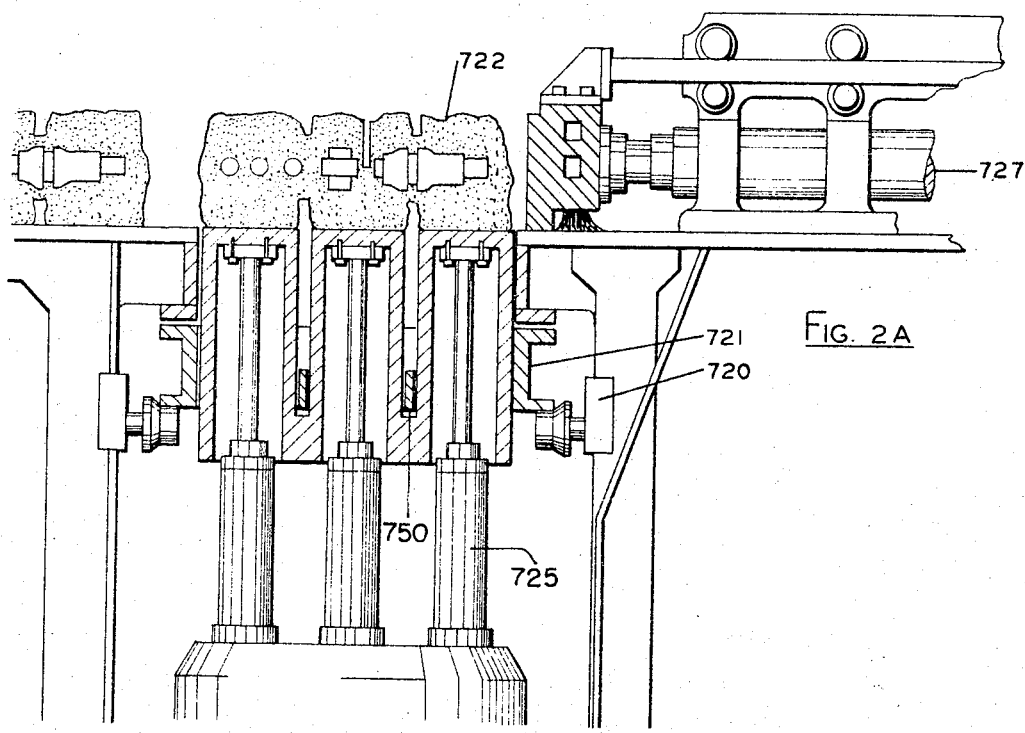
FIG. 2A is a cross sectional view of a multiple ram punch up with a sectioned head.

Now with more particular reference to the drawings, in FIGS. 1, 2, and 3, a production area 10 is shown incorporating a molding machine 11, a pouring section 12, an initial cooling section 13, and a mold punch out section 14 with a cooling conveyor section 16 and a casting removal section 17.

The mold punch out section 14 includes a conveyor 20 for conveying flasks 21 in which sand molds 22 have been formed by means of the molding machine 11. The molding machine 11 may be any of the diaphragm type molding machines such as shown in Patent No. 2,698,976.

The completed molds 22 are forced down the conveyor and pass under a punch out frame 24 where a ram 25 forces a platen 26 up against the bottoms of the molds 22 and forces them out of the flasks 21. A ram 27 may be actuated to push the molds 22 laterally by means of a push off device 28 which is attached to the piston rod of the ram 27. A brush 29 which is made of wire or plastic bristle may be fastened to the bottom of the push off device 28 to keep the sand swept off of a platform 30, flasks 21, and platen 26 in order to maintain a clean arrangement. This sand may fall down into the space below a frame 31 where it may be reclaimed. The empty flasks then pass under a flask cleaner 32 and thence on down the conveyor to the molding machine 11.

When the molds are pushed laterally onto the conveyor section 16, they move down the conveyor toward the sand removal section 17 at a controlled rate of speed which may be varied to control the amount of cooling which takes place before the castings are removed from the sand. The sand removal section 17 may be of a conventional type. The conveyor on the area 10 may be of a slat type having a plurality of flat boards as shown which form a substantially continuous surface to support the molds.

Figure 4A:
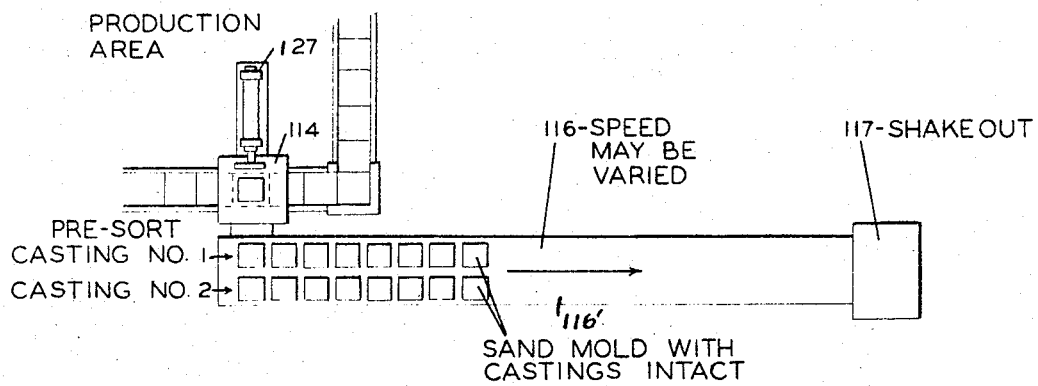
FIG. 4A is a plan view of a double width conveyor for pre-sorting castings constituting another embodiment of the invention.

In the embodiment of the invention shown in FIG. 4A, the punch up section 114 may be similar to the punch up section 14 shown in FIGS. 1, 2, and 3; however, in this embodiment, an alternate form of cooling conveyor made up of two parallel cooling conveyors 116 and 116' is shown. These conveyors may have separate conveyor members thereon which operate independently so that the castings on the two conveyors adjacent the punch up section can be moved at a different rate to control the amount of cooling that takes place prior to the time they reach the shake out position 117.

Figure 4B:
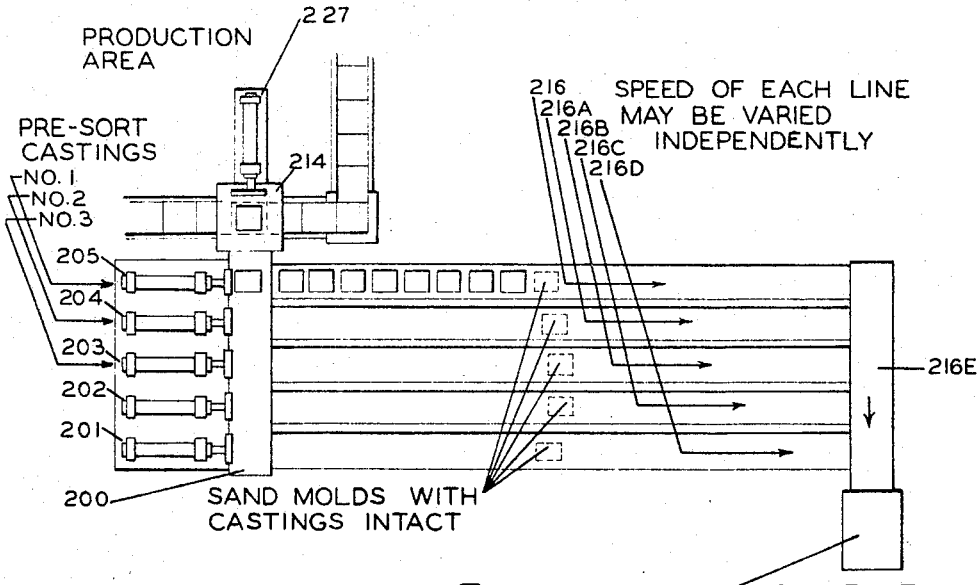
FIG. 4B is a plan view of separate conveyors for pre-sorting and regulating the cooling cycle of molds.

In the embodiment of the invention shown in FIG. 4B, another embodiment is shown wherein a punch up section 214 is similar to that shown in the embodiments of FIGS. 1, 2, 3, and 4A. In this embodiment, however, five parallel conveyors 216, 216A, 216B, 216C, and 216D are shown wherein the five conveyors can be operated independently driven by independent drives. The articles from the conveyors 216 to 216D discharge onto a lateral conveyor 216E which carries the articles to the shake out section 217.

The embodiment of the invention disclosed in FIG. 2C shows a platen 326' and a ram 325' provided to raise the mold to the height of a shake out section 317' above a platform 330'. The platen 326' will engage the bottom of a sand mold in a flask 321' carried on the conveyor 320' and raise the mold 322' to the level of the platform 330 from whence it will be moved laterally by a ram 327' to the shake out section 317'.

This embodiment is useful where a short time is necessary between the time the mold is pushed from the flask and the time that it is punched out and shaken out of the flask and to maintain a low level cooling conveyor 331'.

In the embodiment of the invention shown in FIG. 6A, a machine having a frame 431 is provided with conveyor rollers 420 which support flasks 421 and conduct them to a position above a ram 425 which has a platen 426 thereon. The platen 426 may be brought into engagement with the bottom of a mold 422 to force it up to the level of a slide 430 from whence it can be pushed onto a mold car conveyor 441 whereby it may be conducted to a suitable cooling area or to a shake out section. The sand may be pushed laterally by a ram 427 which will have a push off device 428 thereon.

In the embodiment of the invention shown in FIGS. 6B and 6C, the push off device having a frame 531 and conveyor rolls 520 thereon carries flasks 521. A ram 525 has a platen 526 thereon which engages the bottom of a sand mold 522 and forces it up to the level of a slide 531 from whence it can be pushed onto a lifting conveyor 541. The lifting conveyor 541 is supported by a suitable chain 542 or other lifting device from which it may be suspended and conveyed to a proper location. The lifting conveyor 541 can be guided by suitable roller guides 543 as shown. Such a device can be moved to the normal tilted position shown in FIG. 6C whereby the mold will be readily conveyd to a shake out position.

Several independent rams as shown in FIGS. 2A, 2B, 5, 5A, and 5B are provided on a single table top. The table top as shown in FIG. 2A is sectioned so as to pass around any bars 750 which may be in the flask. Even though the rams are segmented or sectioned, they are still fastened rigidly in an effort to equalize the punching up forces and in an effort to retain a mold 722 in one large piece. This would not be possible if the rams 725 were to act at different speeds with different sections of the flask. The flasks 721 are carried on a conveyor 720. The mold may be pushed laterally from the ram by a push off cylinder 727.

Figure 2B:
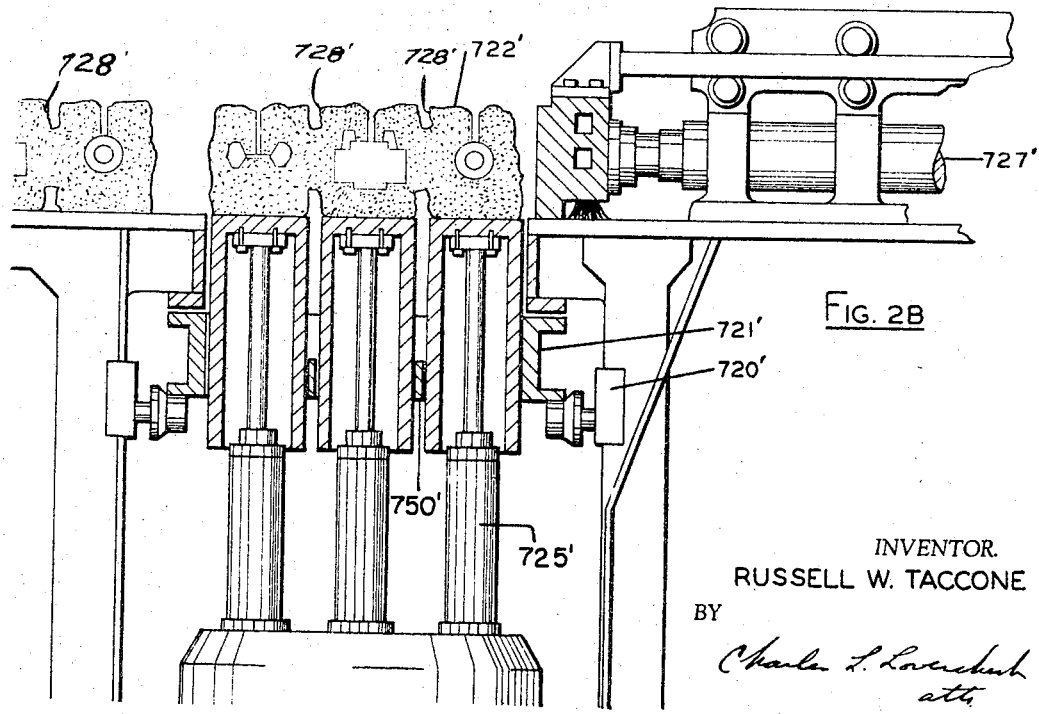
FIG. 2B is a cross sectional view of a multiple ram with independent heads on each ram.

FIG. 2B shows the use of a multiple ram, each ram having its own table or platen top. In FIG. 2B, a flask 721' will usually be divided by bars 750' and the mold 722' will usually consist of a series or a group of castings, each with its own sprue and runners. The effect will be actually punching up each section or segment of the mold independently of the other one. In this case, the mold 722' will not be retained as one large mold but will probably be punched up at different speeds and each section will come out of the flask at a different time and shear along lines 728'. In the embodiments of both FIGS. 2A and 2B, the flask top section or cope will be lifted off as in FIGS. 5, 5A, and 5B before the punch up operation begins.

In FIG. 2B, three rams or sections are shown. They could match the configuration as required by the bars in the flask, the foundry practices utilized, the metallurgical and casting characteristics which are to be maintained, and any other reason whatsoever.

Figure 5A:
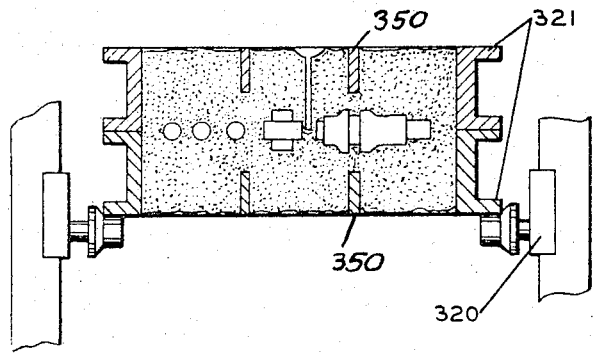
FIG. 5A is a longitudinal cross sectional view of the flask and mold shown in FIG. 5B.
Figure 5B:
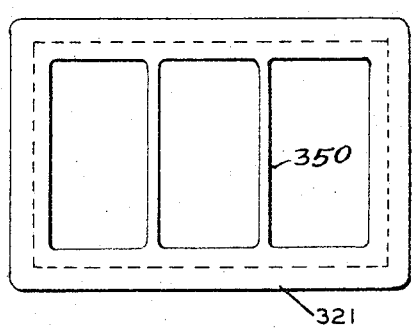
FIG. 5B is a top cross sectional view of the flask and mold shown in FIG. 5A with the cope section lifted off.
Figure 5:
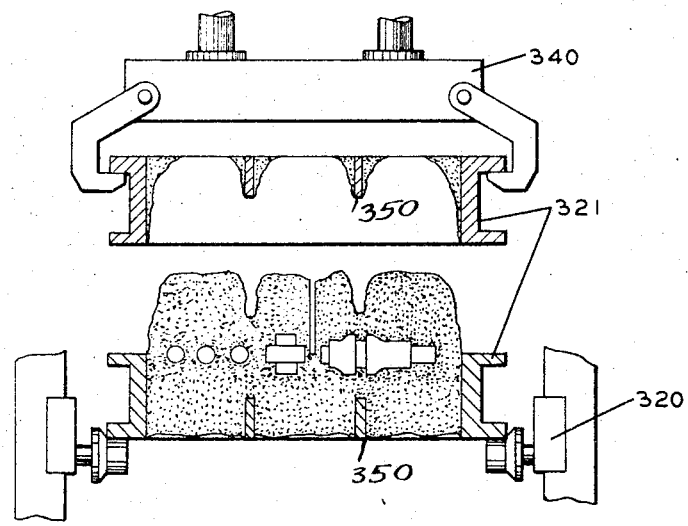
FIG. 5 is a cross sectional view of another embodiment of the invention.

FIGS. 5, 5A, and 5B show a flask 321 having bars 350 therein of a conventional type. The flask can be carried on a conveyor 320. By the process of high density molding used in connection with the present application, the top part of the flask can be lifted off by a lifting mechanism 340 as shown in FIG. 5 and the bottom part of the flask having the mold therein can be placed in a machine of the embodiment shown in FIGS. 2A and 2B.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a first conveyor for conveying flasks, molding means to form molds in said flasks, pouring means to pour molten metal into said molds, said flasks being to be carried by said first conveyor, lifting means below said first conveyor, a platen on said lifting means, said platen being adapted to be freely received in said flasks, means to support said flasks above said platen against upward movement, said lifting means being adapted to force said platen and thereby sand molds from said flasks to an upper level after said metal is poured thereinto, a laterally disposed ram above said conveyor and said flasks for forcing said sand molds laterally from said platen when they are lifted thereby, and conveyor means disposed laterally of said ram.

2. The combination recited in claim 1 wherein said conveyor comprises a flat member adapted to be disposed substantially at the same level of said platen when it is is at said upper level, and suspending means to move said conveyor.

3. The combination recited in claim 2 wherein said conveyor has means thereon to carry a plurality of said molds whereby metal therein may cool while said molds are on said conveyor.

4. In a combination of machines, a pouring station, a cooling conveyor, a punch out station, said pouring station having means to receive flasks having sand molds formed therein and to pour molten metal thereinto, platen means on one of said machines adapted to engage the sand in said flasks at the bottom thereof and to force it from said flasks after metal has been poured into said molds, said cooling conveyor having an upper mold receiving surface substantially on a level with the bottoms of said sand molds when forced from said flasks, and means to force said sand molds from said platen means to said cooling conveyor.

5. The machine recited in claim 4 wherein a shake-out station is provided at an end of said conveyor and means is provided to control the speed of said cooling conveyor to said shake-out station wherein the degree of cooling of said metal is controlled.

6. The machine recited in claim 4 wherein said platen means has slots therein, said flasks have spaced bars therein, and said slots in said platen means receive said bars as said platen means forces said sand from said flasks.

7. A molding machine comprising a molding station, a pouring station, a first conveyor for flasks having sand molds therein, a second conveyor for said molds when forced from said flasks, said second conveyor having a conveying surface substantially on a level with the tops of flasks adapted to be supported on said first conveyor, a punch up station below said first conveyor, platen means for engaging the bottoms of said molds and for forcing said molds from said flasks after molten metal is poured thereinto, and transfer means for forcing said molds from said platen means onto said second conveyor.

8. The machine recited in claim 7 wherein a shake-out station is provided at an end of said second conveyor.

9. The machine recited in claim 8 wherein said platen means has slots therein for receiving transverse bars in said flasks.

10. The machine recited in claim 7 wherein said platen means has a cleaning means thereon for cleaning the insides of said flasks.

References Cited by the Examiner
UNITED STATES PATENTS

| | | | |
|---|---|---|---|
| 977,546 | 12/1910 | Phillips | 22—130 |
| 1,015,374 | 1/1912 | Yeager | 22—95.5 |
| 1,609,802 | 12/1926 | Ekstrom et al. | 198—24 |
| 2,609,576 | 9/1952 | Roush et al. | 22—200 |
| 2,673,363 | 3/1954 | Repper et al. | 15—164 |
| 2,679,669 | 6/1954 | Kempe | 22—200 |
| 2,740,541 | 4/1956 | Ashford | 198—24 |
| 2,904,858 | 9/1959 | Pinchon | 22—34 |
| 3,076,238 | 2/1963 | Rekart | 22—95.2 |
| 3,222,434 | 12/1965 | Stedman | 25—2 |

J. SPENCER OVERHOLSER, *Primary Examiner.*

R. D. BALDWIN, *Assistant Examiner.*